(No Model.)

J. GOODNOUGH.
CULTIVATOR COUPLING.

No. 318,243.　　　　　　　　　Patented May 19, 1885.

WITNESSES.
Jacob W. Loeper
George Loeper

INVENTOR.
John Goodnough
By C. P. Jacobs
Atty.

UNITED STATES PATENT OFFICE.

JOHN GOODNOUGH, OF INDIANAPOLIS, INDIANA.

CULTIVATOR-COUPLING.

SPECIFICATION forming part of Letters Patent No. 318,243, dated May 19, 1885.

Application filed March 30, 1885. (No model.)

*To all whom it may concern:*

Be it known that I, JOHN GOODNOUGH, a resident of Indianapolis, Indiana, have made certain new and useful Improvements in Cultivator-Couplings, a description of which is set forth in the following specification, reference being made to the accompanying drawings, in the several figures of which like letters indicate like parts.

My invention consists in a new device for connecting the plow-beams of a cultivator with the axle, and will be understood from the following description.

Figure 1:
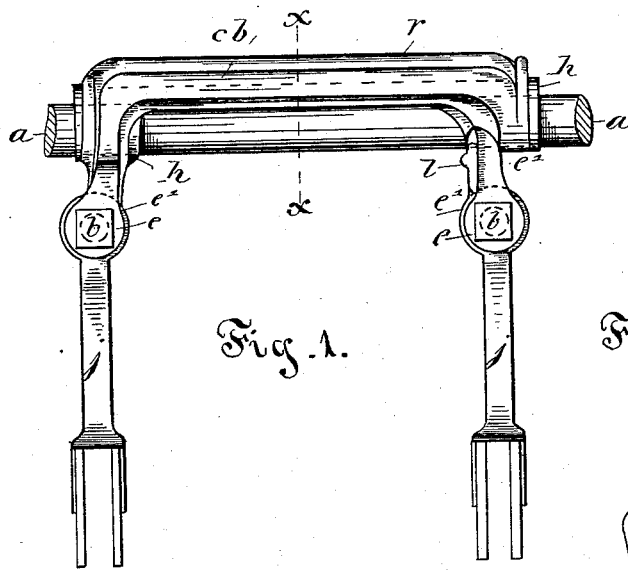
Figure 2:
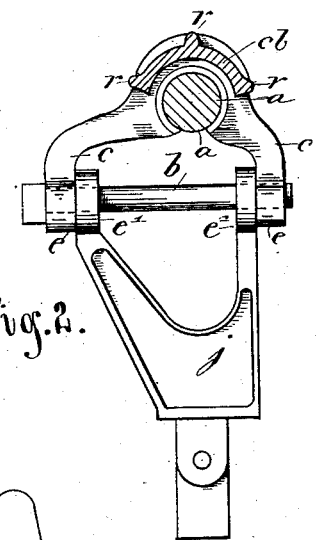
Figure 3:
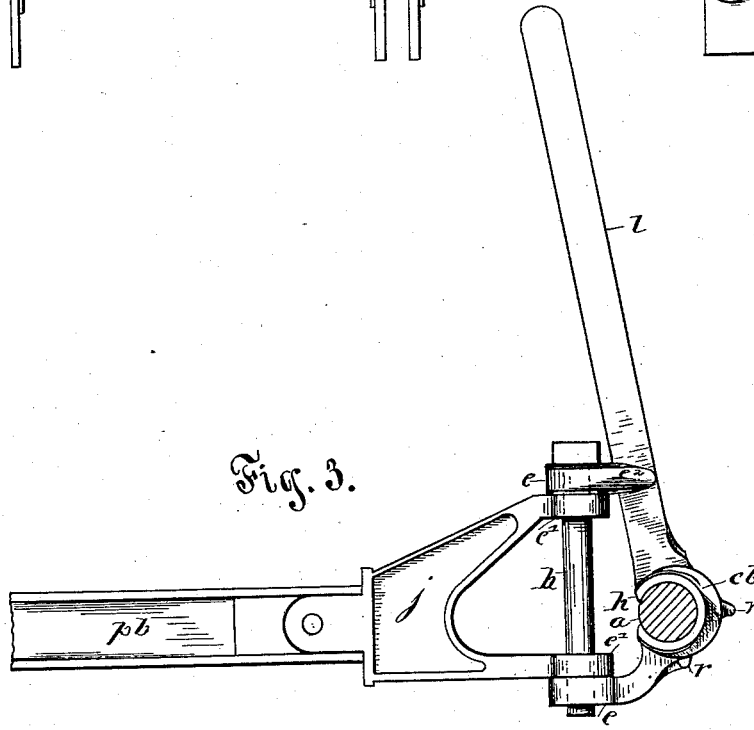

In the drawings, Figure 1 is a plan view of my device from above. Fig. 2 is a section on the line $xx$, Fig. 1; and Fig. 3 is an end view.

In detail $pb$ represent the plow-beam, which is made of channeled iron, and its forward end is connected with a jaw, $j$, having eyes $e'$, which pass between the eyes $e$ of the coupling device, and a bolt, $b$, passes through both sets of eyes, connecting the parts together. $cb$ is a connecting-brace arched on the under side and having ribs $r$ on the outer side. This brace has an extension or lever, $l$, for connection with any suitable spring, and open hubs, $h$, at each end, through which the axle passes, and on each side of the opening in these hubs are upper and lower projections having eyes $e$, which form, as it were, jaws on this coupling to receive the jaws of the plow-beam.

The view in the drawings represents the left-hand coupling, and a corresponding one is used on the right hand, the levers $l$ being placed on the inside of each coupling. The axle $a$ only has a bearing in the open hubs $h$, formed on each side of the brace $cb$, and by this construction, although two plow-beams are hinged to each coupling on each side, the short bearing formed by the open hubs will be found amply sufficient, connected as they are by the arched brace $cb$, and I am thus able to dispense with the long bearings of the pipe-box which is commonly used, at the same time securing greater freedom of movement for the sets of the plow-beams than if they were hinged to a solid sleeve, while I sacrifice nothing in strength, the arched brace being amply sufficient for all practical purposes.

What I claim as my invention, and desire to secure by Letters Patent, is the following:

1. The arched brace $cb$, having the open hubs $h$, and the eyes $e$ in projections forming a jaw to receive the eyes $e'$ of the jaw $j$, connected with the plow-beam, substantially as described.

2. The arched-brace $cb$, having the open hubs $h$ at either end and projections above and below such hubs to receive the jaws $j$, connected with the plow-beam, and the lever $l$, connected with said brace, the plow-beams $pb$, and jaws $j$, connected therewith, and the bolts $b$, for uniting the parts, all combined substantially as described.

3. A pair of open hubs adapted to receive the axle $a$, and connected by a brace provided with jaws at each end to receive corresponding jaws connected with the plow-beam, substantially as described.

In witness whereof I have hereunto set my hand this 24th day of March, 1885.

JOHN GOODNOUGH.

Witnesses:
C. P. JACOBS,
W. E. BARTON.